G. H. Henkel,
Cradle.
No. 93,437.   2 Sheets, Sheet 1.
Patented Aug. 10, 1869.
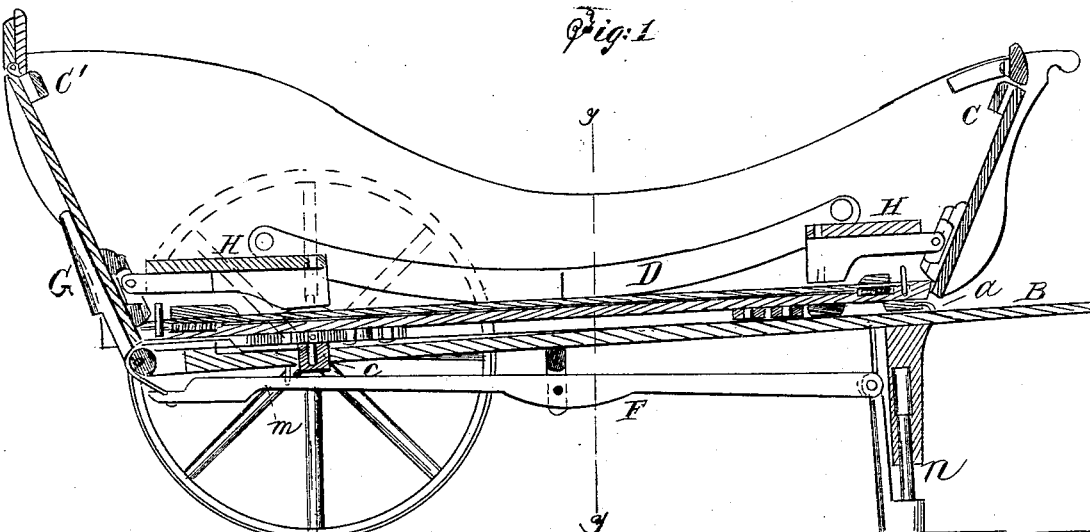
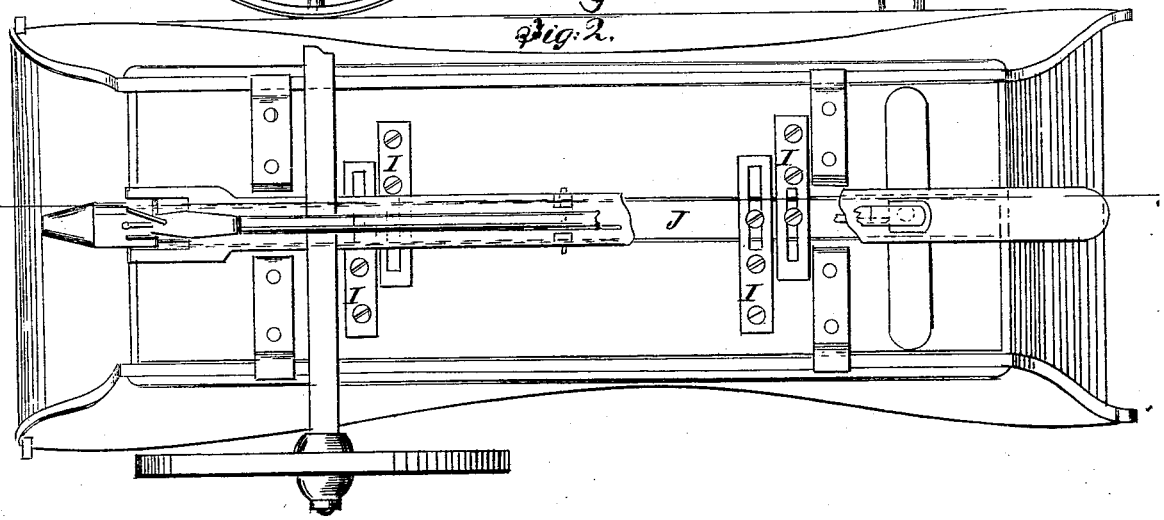
WITNESSES.
Joh. Becker
O. Hinchman
INVENTOR.
G. H. HENKEL.
pr ———
Attorneys.

2 Sheets, Sheet 2.
G. H. Henkel,
Cradle.
No. 93,437. Patented Aug. 10. 1869.
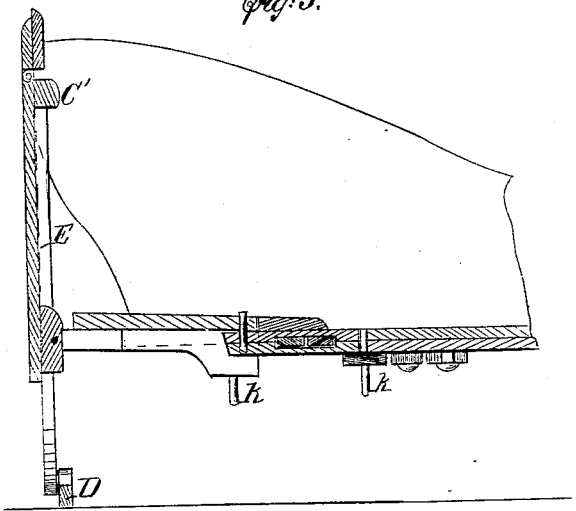
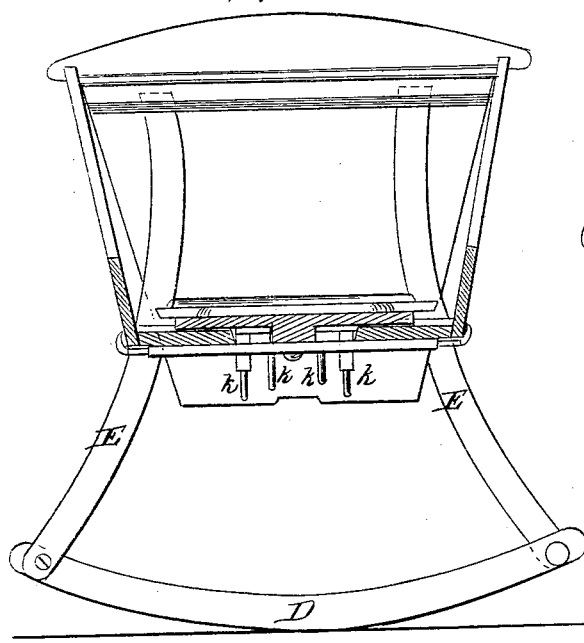
WITNESSES
Joh. Becker
O. Hinchman
INVENTOR.
G. H. HENKEL.
pr. [signature]
Attorneys.

United States Patent Office.

GEORGE H. HENKEL, OF HARTFORD CITY, INDIANA.

Letters Patent No. 93,437, dated August 10, 1869.

IMPROVEMENT IN CAB AND CRADLE.

The Schedule referred to in these Letters Patent and making part of the same.

*To all whom it may concern:*

Be it known that I, GEORGE H. HENKEL, of Hartford City, in the county of Blackford, and State of Indiana, have invented a new and improved Cab and Cradle; and I do hereby declare that the following is a full, clear, and exact description thereof, which will enable others skilled in the art to make and use the same, reference being had to the accompanying drawings, forming part of this specification.

This invention relates to a new and improved arrangement whereby a child's cab is converted into a cradle, and *vice versa;* and The invention consists in constructing a combined cab and cradle convertible from one to the other at pleasure, as hereinafter described.

In the accompanying plates of drawings—

Figure 1 represents a vertical longitudinal section of the cab, showing the rockers within the cab as when not in use, the section being on the line x x of fig. 2.

Figure 2 is a bottom view, showing the method of extending the bottom when the same is used as a cradle.

Figure 3, plate 2, is a broken section on the line x x, showing the method of forming the cradle-bottom.

Figure 4, same plate, is a vertical cross-section through the line y y.

Similar letters of reference indicate corresponding parts.

As represented in fig. 1, the cab is shown with the wheels in place. The wheels are attached to the cab-body by placing the little hook found on the end of the tongue in a hole in the front edge of the cross-piece on the front end of the cab-body, as seen at a, fig. 1.

B is the pole.

When the hook a is thus placed, the two pins seen at c are pressed into the two holes through the axle, as seen in the drawing.

The rockers are folded and placed, one on each side, inside the cab.

By lifting the projections or extension-pieces at each end, and throwing them toward the centre, and then pressing in the bottom of the sides, the cab is complete and ready for the wheels.

When thus converted from a cradle, first raise the cab up, and draw the rockers directly down, when the rocker-posts will leave the mortises, at their top ends, under the cross-pins c', as seen.

When used as a cab, the weight of the front end, with the additional weight of a child, will press down the end, which operates on the lever F, and throws down the prop G to the ground, which prevents the cab tipping back. The prop is connected with a cord and drum, as seen.

H H represent the projections or extension-pieces at each end, which serve to elongate the body when used as a cradle, and support the rockers in a proper position.

The bottom is made in longitudinal sections, connected together by the slotted transverse pieces marked I, which allow of the extension.

The side or outer sections are limited in their movement by screws in the stationary pin J, as seen in the drawing. These sections are held in position by the extension-pieces H H, which serve as seats when the body is contracted for a cab.

The method of extending and holding the body is shown in the figs. 3 and 4. k represents the pins which are pressed into holes for that purpose.

The method in which the prop G is operated through the lever F and cord and drum, is plainly seen in fig. 1.

The end of the lever is drawn up by an elastic spring, seen at m when it is not depressed by the weight. The other end of the lever has a tubular guide arranged as seen at n.

The ends of the body are hinged or pivoted to the sides at their top edges, and the extension-pieces H H are hinged to the ends, so that when used to extend the length, they are parallel with the bottom, but when used as a cab, they are raised, so as to form a seat.

As a cradle, the rockers are held in their places by the weight of the cradle.

The drawing, fig. 4, shows the head rocker as when in place.

D represents the rockers, and E, the supports or posts which are pivoted to the rockers, as seen in the drawing. When they are removed, they are folded up and placed in the cab, as seen in fig. 1.

It will thus be seen that the article is readily convertible from a cab to a cradle, and from a cradle to a cab, and that each article is perfect in itself. The advantages of this arrangement need not be enumerated; they are many, and must be obvious to all.

Having thus described my invention,

I claim as new, and desire to secure by Letters Patent—

The combination of the extension-pieces H H, the adjusting transverse pieces I, the prop G, lever F, rocker D, and posts E, the whole constructed and operating as described.

GEO. H. HENKEL.

Witnesses:
CHAS. F. JACKSON,
S. H. DEVORE.